United States Patent [19]

Morris, deceased et al.

[11] Patent Number: 4,687,806

[45] Date of Patent: Aug. 18, 1987

[54] METHOD OF REDUCING VISCOSITY OF RADIATION CURABLE ACRYLATE FUNCTIONAL RESIN

[75] Inventors: William J. Morris, deceased, late of Louisville, by Carla L. Morris, legal representative; Richard R. Kemmerer, Louisville; Byron K. Christmas, Jeffersontown, all of Ky.

[73] Assignee: Interez, Inc., Louisville, Ky.

[21] Appl. No.: 798,451

[22] Filed: Nov. 15, 1985

[51] Int. Cl.$^4$ .......................... C08K 3/16; C08K 5/05; C08L 63/10

[52] U.S. Cl. ....................... 524/765; 522/71; 522/79; 522/84; 522/100; 522/103; 524/796; 524/854; 525/922; 526/238; 526/318.42; 526/320

[58] Field of Search ............... 524/796, 401, 854, 765; 526/238, 318.42, 320; 522/71, 79, 84, 100, 103

[56] References Cited

U.S. PATENT DOCUMENTS 4,425,472  1/1984  Howard et al. ..................... 526/301

*Primary Examiner*—C. Warren Ivy
*Attorney, Agent, or Firm*—Herbert P. Price

[57] ABSTRACT

This invention relates to the addition of lithium bromide to a polymeric material to reduce the viscosity of the polymeric material. This invention finds particular use in the reduction of the viscosity of radiation curable compositions, such as polyacrylates.

23 Claims, No Drawings

METHOD OF REDUCING VISCOSITY OF RADIATION CURABLE ACRYLATE FUNCTIONAL RESIN

BACKGROUND OF INVENTION

1. Field of Invention

This invention relates to a composition for reducing the viscosity of polymeric materials. More particularly, the instant invention relates to the reduction of the viscosity of polyacrylates which are employed in radiation curable coating compositions.

2. Prior Art

Polyacrylate esters of polyglycidyl ethers have been particularly useful in protective coatings because of their rapid cure rates, high degree of toughness and good chemical resistance. However, their extremely high, neat viscosity has been a serious drawback, particularly in those photocurable systems where the presence of a solvent would significantly increase cure time. Because nearly all polyacrylates of polyglycidyl ethers are resinous and of extremely high viscosity—often approaching 2,000,000 cps—some solvent or diluent must usually be employed. This is especially so when polyacrylates are used in radiation curable compositions.

Several approaches have been employed in the prior art to find a solution to the viscosity problem of radiation curable systems. For example, inert volatile organic solvents and the more volatile monomeric reactive diluents have been added to these polymers in an effort to reduce their viscosity. In addition, the structure of the oligomer backbone has been modified such as by end capping secondary hydroxyl groups using vinyl ethers.

However a number of problems are encountered when the viscosity reduction procedures of the prior art are employed. Such procedures can add additional and expensive steps in the manufacturing process or can adversely affect the curing properties of the composition. In addition, the introduction of some materials into the composition to reduce viscosity can cause a separation of the composition into resin and diluent phases. And when secondary hydroxyl groups are chemically blocked, undesirable by-products that must be removed are often produced. Furthermore the solvents used to reduce viscosities of these polymeric compositions to an acceptable level when evaporated cause pollution of the environment. Hence, it is desirable to reduce the amount of solvent used or to use environmentally safe solvents, such as water. Moreover, additional energy is required to remove solvents added to the composition.

U.S. Pat. No. 4,425,472 discloses that the incorporation of water in amounts insufficient to form a stable water-in-oil emulsion is effective in reducing the viscosity of radiation curable compositions containing at least one olefinically unsaturated polymeric material. The use of water in accordance with this patent allegedly reduces the viscosity without adversely affecting the curable composition or its curing properties. However, the viscosities obtained by the addition of water are still well in excess of satisfactory levels.

Accordingly, an object of this invention is to reduce the viscosity of polyacrylates.

It is another object of this invention to reduce the viscosity of radiation curable compositions and to facilitate handling without adversely affecting the curing properties of the compositions.

These and other objectives are obtained by preparing the compositions of the instant invention.

SUMMARY OF INVENTION

This invention involves the reduction of the viscosity of polymeric compositions by the addition of about 0.05 to about 0.5 percent by weight of lithium bromide. It is preferred to dissolve lithium bromide in a solvent such as water or methanol and add a lithium bromide solution to the polymer. The invention is particularly useful in reducing the viscosity of radiation curable polyacrylates.

DETAILED DESCRIPTION OF INVENTION

This invention is applicable to oligomeric polyacrylates or methacrylates which contain secondary hydroxyls in their molecular configuration. Such polyacrylates are the acrylic or methacrylic acid esters of diglycidyl ethers of dihydric phenols or polyglycidyl ethers of aliphatic polyols or diglycidyl ester of dicarboxylic acids. Preferred are diglycidyl ethers of dihydric phenols. When the term "polyacrylate" is used herein, it refers to a molecule that has more than one acrylate, methacrylate or ethacrylate group attached to it.

The epoxy polyacrylates used in the present invention can be prepared by reacting acrylic acid with polyepoxides or polyglycidyl ethers, such as the diglycidyl ether of Bisphenol-A. Examples of patents which disclose the preparation of polyacrylates in the above manner include U.S. Pat. Nos. 4,072,592, 3,676,398, and 3,770,602. These patents are incorporated herein by reference.

The polyepoxide compounds which are useful in making polyacrylates under this method of preparation are diepoxides prepared based upon aliphatic or aromatic diols or dicarboxylic acids. The polyepoxide materials must contain terminal epoxide groups of the 1, 2 or vicinal type.

Among the aromatic epoxides useful in making polyacrylates are the glycidyl polyethers of dihydric phenols, which materials contain about two 1,2-epoxide groups per molecule. Such materials generally are prepared by reacting a dihydric phenol and a epihalohydrin and have an epoxide equivalent weight of about 150–300. Examples of the epihalohydrins are epichlorohydrin, epibromohydrin, epiiodohydrin, with epichlorohydrin being preferred. The aromatic or aliphatic diols are exemplified by resorcinol, hydroquinone, p,p'-dihydroxyphenyl propane (or Bisphenol-A as it is commonly called), p,p'-dihydroxybenzophenone, p,p'-dihydroxybiphenyl, p,p'-dihydroxydiphenyl ethane, bis(2-hydroxynaphthyl)methane, 1,5-dihydroxynaphthalane, ethylene glycol, propylene glycol, 1,4-butanediol, hydrogenated Bisphenol-A, 1,4-cyclohexanediol, 1,3-cyclopentanediol, cyclohexane dimethanol and the like. These polyepoxide resins are well known in the art. Preferably the polyepoxide resins are prepared by reacting the epihalohydrin in an amount at least equal to the phenolic hydrogens, and most preferably in excess in the presence of an alkali metal hydroxide sufficient to dehydrohalogenate the reaction product.

A second type of polyepoxide which is useful in preparing polyacrylates is a glycidyl polyester prepared by reacting an epihalohydrin, such as epichlorohydrin, with an aromatic or aromatic-based polycarboxylic acid, such as, for example, one of the phthalic or phthalic-based acids and then dehydrohalogenating under relatively low temperatures and/or low pressures. The preparation of polyglycidyl esters is further described in U.S. Pat. No. 3,859,314, which is incorporated herein by reference. The preferred epoxide compounds useful in this invention are the diglycidyl ethers of dihydric phenols, such as Bisphenol-A.

In the present invention, lithium bromide may be added directly to the curable composition as a solid or it can be dissolved first in an appropriate solvent and added in the form of a lithium bromide solution. It is preferred to add a lithium bromide solution rather than solid lithium bromide because it is much more difficult to incorporate lithium bromide into the curable composition when solid lithium bromide is added.

In the curable composition, as little as 0.05 percent by weight based upon the total weight of the curable polymeric composition of lithium bromide can produce significant reductions in the viscosity of the polyacrylated resin. The percent by weight range of lithium bromide added to the curable composition is 0.05 to 0.5, with the range of 0.1 to 0.2 being preferred. As more than about 0.5 percent lithium bromide is added to the polymeric resin, the viscosity of the resin can begin to increase. Thus, there is an optimum amount of lithium bromide required to achieve the maximum reduction in viscosity. However, the optimum amount will vary to a certain extent depending upon the polymeric resin used.

In the present invention lithium bromide may be dissolved in a polar solvent or acid before it is added to the polymer. Any polar solvent in which lithium bromide is soluble may be used as long as the polar solvent does not adversely affect the curing properties of the polymeric composition or react with the polymeric material. The preferred solvents are water, methanol, ethanol, iso-propanol, acrylic acid and methacrylic acid. The most preferred solvents are water and methanol.

Either a saturated or unsaturated lithium bromide solution may be added to the polymeric material. Since small amounts of lithium bromide will cause a significant reduction in the viscosity, low amounts of the ionic salt solution can be used. A saturated solution will contain about 60 percent by weight of lithium bromide if the solvent is water. The amount of lithium bromide solution that is added will depend upon the concentration of the lithium bromide solution. In non-saturated solutions, lithium bromide can be present at about the 5 to 20 percent by weight level and the solvent at about the 80 to 95 percent by weight level based on the total weight of the solution. The amount of solvent used will vary from about 1.5 to about 1.95 percent by weight based on the total weight of the composition and, preferably, will vary from about 1.8 to about 1.9 percent by weight.

The temperature at which the oligomer and the lithium bromide are blended is important. Generally, the higher the temperature at the time of blending, the lower the resulting viscosity. Blending can occur at temperatures ranging from about 40° C. up to about 115° C. The preferred blending temperature is usually about 40° C. to about 105° C. When a Bisphenol-A diglycidyl ether diacrylate resin is used, a particularly preferred temperature is about 93° C. to 105° C. The oligomer and the lithium bromide solution are blended and held at the blending temperature until they are well mixed, usually about 10 to 30 minutes depending on the polyacrylate being used.

The present invention addresses the problems involved with the prior art methods of reducing viscosity. The high viscosity of 100 percent solids polymeric compositions is significantly reduced by the addition of an ionic salt solution. This enables such compositions to be handled more easily. The ionic salt solution does not significantly increase the costs involved or adversely affect the curing properties of the composition. Furthermore, since low levels of the ionic salt solution are used, few pollutants are released into the environment.

It has been found that the lithium bromide containing polyacrylate may be mixed with a reactive diluent to produce curable products. Reactive diluents as used herein are compounds which contain one up to about six unsaturated groups per molecule which can be polymerized by radiation. The reactive diluents useful in this invention have viscosities of less than 2000 cps at 75° C. and are liquid at room temperature (25° C.), i.e., not gaseous or crystalline. Examples of reactive diluents are acrylate and methacrylate esters of $C_1$–$C_{12}$ monohydric alcohols, vinyl esters of $C_2$–$C_4$ monocarboxylic acids, vinyl aromatic monomers, vinyl heterocyclic monomers, acrylate and methacrylate esters of polyols, polyalkoxyalkyl esters of acrylic and methacrylic acid, and the like. Specific examples of such compounds include vinyl acetate, ethyl acrylate, 2-ethylhexyl acrylate, methyl methacrylate, styrene, vinyl pyrrolidone, ethoxyethoxyethyl acrylate, hexanediol diacrylate, trimethylolpropane triacrylate, tripropylene glycol diacrylate, trimethylolethane trimethacrylate, pentaerythritol tetraacrylate, dipentaerythritol hexaacrylate, and the like. The amount of reactive diluent used will vary from about 0 to about 75 weight percent, preferably from about 20 to about 50 weight percent, based on the total weight of acrylated polyepoxide and reactive diluent.

The lithium bromide containing polyacrylates prepared above may be utilized in photocurable coating compositions as the only curable material. They may also be blended with up to about 95 percent by weight, based on the total curable composition, of another alpha beta ethylenically unsaturated vinyl polymerizable compound containing two or more vinyl polymerizable groups per molecule. Examples of these materials are set forth in U.S. Pat. No. 4,207,155. In addition, the photocurable compositions may contain compounds having a single polymerizable ethylenically unsaturated group of the acrylate, methacrylate, or vinyl type, all as disclosed in the aforementioned U.S. patent. Also, the compositions of the instant invention may be compounded with polymeric materials containing no polymerizable unsaturation, as well as with immiscible polymeric or nonpolymeric, organic or inorganic fillers, reinforcing agents or pigments in varying amounts.

The compositions of this invention can be applied by conventional means, including brushing, spraying, dipping, curtain and roll coating techniques, and may, if desired, be dried under ambient or oven conditions. The compositions of the instant invention find particular utility when used in ultraviolet curable systems to provide coatings for metals, e.g., iron, steel, copper, aluminum and the like.

The invention is illustrated by the following examples, of which all parts and percentages are by weight, unless otherwise indicated. All viscosities were measured at 25° C. using a Brookfield viscometer.

EXAMPLE 1

An ionic salt solution was prepared by dissolving 7.5 grams of lithium bromide in 32.5 grams of water. Two grams of the salt solution were blended at 98° C. with 98 grams of Celrad 3700. Celrad 3700 is a Bisphenol A diglycidyl ether diacrylate resin available from Celanese Specialty Resins having a molecular weight of about 520 and a viscosity of 1,200,000 cps at 25° C. The mixture was held at 98° C. for 15 minutes and then cooled. The viscosity measured at 25° C. was 145,000 cps.

EXAMPLE 2

Example 1 was repeated except that 2 grams of water were added to 98 grams of Celrad 3700 and no lithium bromide was added. The resulting product had a viscosity of 410,000 cps.

EXAMPLE 3

Two grams of methanol were blended with 98 grams of Celrad 3700 at 98° C. for 15 minutes and then cooled. The viscosity was 275,000 cps.

EXAMPLE 4

A solution containing 1.81 grams of methanol and 0.19 grams of lithium bromide was blended for 15 minutes with 98.0 grams of Celrad 3700 at 98° C. and then cooled. The viscosity was 150,000 cps. The results of Examples 3 and 4 are shown in Table I.

EXAMPLE 5

Example 1 was repeated except that the percent by weight of water was varied from 1.85 to 1.80 and the percent by weight of lithium bromide was varied from 0.15 to 0.20. The results are shown in Table II along with the results from Example 6.

EXAMPLE 6

A solution containing 1.85 grams of water and 0.15 grams of lithium bromide was blended with 98.0 grams of Celrad 3700 for 15 minutes at 75° C. and then cooled. The viscosity of the resulting blend was 180,000 cps. (In Example 5, the same experiment was performed except that the blending temperature was 98° C., and the resulting viscosity was 135,000 cps).

EXAMPLE 7

Example 1 was repeated except that Celrad 3701 (a modified Bisphenol-A diglycidyl ether diacrylate resin, available from Celanese Specialty Resins) was employed instead of Celrad 3700 and the amount of water was varied from the 1.80 to 2.0 percent by weight level while the lithium bromide level ranged from the 0 to 0.20 percent by weight level. Celrad 3701 has a molecular weight of 840, and its viscosity at 25° C. is 1,300,000 cps. The results are shown in Table III.

EXAMPLE 8

Example 1 was repeated except that CMD 1701 (a polyacrylated glycidyl ether of an acrylic polymer resin available from the Celanese Specialty Resins) was employed instead of Celrad 3700 and the amount of water was varied from the 1.80 to 2.0 percent by weight level while the lithium bromide level ranged from the 0 to 0.20 percent by weight level. CMD 1701 has a molecular weight of 27,500, and its viscosity at 25° C. is 2,000,000 cps. The results are shown in Table IV.

EXAMPLE 9

An ionic salt solution was prepared by dissolving 0.15 grams of lithium bromide in 1.85 grams of water. 98 grams of Celrad 3700 were heated to 98° C., and then the 2.0 grams of the ionic salt solution were added and mixed well. The addition of the ionic salt solution caused the temperature to drop to 92° C. where it was held an additional 5 minutes before it was cooled to room temperature. The viscosity of the resulting blend measured at 25° C. was 224,000 cps.

A formulation containing 30 percent by weight trimethylolpropane triacrylate and 70 percent by weight of the lithium bromide/Celrad 3700 blend described above was prepared. 2.0 pph of 1-hydroxy cyclohexyl phenyl ketone were added to the Celrad 3700/trimethylolpropane triacrylate mixture. The composition was then drawn down on Bonderite No. 40 treated panels using a #6 Meyer Rod and cured in a Fusion Ultraviolet Curing Unit Model F-440 Fusion Systems Corporation, Rockville, Md. at a line speed of 204 feet per minute using two 300 watt/in lamps located 0.175 ft from the substrate. The coating was well cured exhibiting resistance to more than 200 methylethyl ketone double rubs.

EXAMPLE 10

Example 9 was repeated except that only Celrad 3700 was used instead of Celrad 3700 containing lithium bromide. A comparison between the cured formulations of Examples 9 and 10 showed that the physical properties were virtually identical.

EXAMPLE 11

An ionic salt solution was prepared by dissolving 0.15 grams of lithium bromide in 1.85 grams of water. 98 grams of Celrad 3700 were heated to 98° C. and then the 2 grams of ionic salt solution were added and blended well. The temperature fell to 91° C. after the addition of the ionic salt solution. The mixture was held at 92° C. for 5 minutes and then cooled to room temperature. To 100 grams of the mixture was added 0.5 pph of the photoinitiator identified in Example 9. The mixture was then poured into a glass mold to a thickness of ⅛ inch. The casting was cured and had a cured thickness of ⅛ inch using the conditions described in Example 9. The resulting cured composition had a tensile strength of 6240 psi and an elongation of 1.10 percent.

As can be seen from the above, significant reductions in the viscosity of otherwise high viscosity curable resins can be obtained when lithium bromide solutions are blended with the resins. The reduction in viscosity when lithium bromide is employed is significantly greater than when water or methanol alone is used to reduce the viscosity. Moreover, the resulting coatings possess cured state film properties equivalent to those of the non-lithium bromide modified, prior art, curable resins.

TABLE I

EFFECTS OF METHANOL AND LITHIUM BROMIDE ON THE VISCOSITY OF A BISPHENOL A DIGLYCIDYL ETHER DIACRYLATE RESIN (CELRAD 3700)

| | | EXAMPLE 3 | EXAMPLE 4 |
|---|---|---|---|
| Bisphenol A diglycidyl ether diacrylate resin (Celrad 3700) | 100 g | 98 g | 98 g |
| Methanol | — | 2 g | 1.81 g |
| LiBr | — | — | 0.19 g |
| Viscosity @ 25° C. (cps) | 1,200,000 | 275,000 | 150,000 |

TABLE II

EFFECTS OF WATER AND LITHIUM BROMIDE ON THE VISCOSITY OF A
BISPHENOL A DIGLYCIDYL ETHER DIACRYLATE RESIN (CELRAD 3700)

| | | Weight % | | | | |
|---|---|---|---|---|---|---|
| | | EXAMPLE 5 | EXAMPLE 5 | EXAMPLE 5 | EXAMPLE 5 | EXAMPLE 6 |
| Bisphenol A diglycidyl ether diacrylate resin (Celrad 3700) | 100 | 98 | 98 | 98 | 98 | 98 |
| Water | — | 2 | 1.85 | 1.82 | 1.80 | 1.85 |
| LiBr | — | — | 0.15 | 0.18 | 0.20 | 0.15 |
| Blend Temp. (°C.) | — | 98 | 98 | 98 | 98 | 75 |
| Viscosity @ 25° C. (cps) | 1,200,000 | 410,000 | 135,000 | 165,000 | 160,000 | 180,000 |

TABLE III

EFFECTS OF WATER AND LITHIUM BROMIDE ON THE
VISCOSITY OF A MODIFIED BISPHENOL A DIGLYCIDYL ETHER DIACRYLATE
RESIN (CELRAD 3701)

| | | Weight % | | | |
|---|---|---|---|---|---|
| | | EXAMPLE 7 | EXAMPLE 7 | EXAMPLE 7 | EXAMPLE 7 |
| Modified Bisphenol A diglycidyl ether diacrylate resin (Celrad 3701) | 100 | 98 | 98 | 98 | 98 |
| Water | — | 2 | 1.85 | 1.82 | 1.80 |
| LiBr | — | — | 0.15 | 0.18 | 0.20 |
| Blend Temp. (°C.) | — | 98 | 98 | 98 | 98 |
| Viscosity @ 25° C. (cps) | 1,300,000 | 520,000 | 210,000 | 220,000 | 230,000 |

TABLE IV

EFFECTS OF WATER AND LITHIUM BROMIDE ON THE
VISCOSITY OF A GLYCIDYL ETHER OF AN ACRYLIC POLYMER (CMD 1701)

| | | Weight % | | | |
|---|---|---|---|---|---|
| | | EXAMPLE 8 | EXAMPLE 8 | EXAMPLE 8 | EXAMPLE 8 |
| Acrylated Acrylic (CMD-1701) | 100 | 98 | 98 | 98 | 98 |
| Water | — | 2 | 1.85 | 1.82 | 1.80 |
| LiBr | — | — | 0.15 | 0.18 | 0.20 |
| Blend Temp. (°C.) | — | 98 | 98 | 98 | 98 |
| Viscosity @ 25° C. (cps) | 2,000,000 | 620,000 | 420,000 | 450,000 | 465,000 |

What is claimed:

1. A radiation curable composition comprising an oligomeric polyacrylate having secondary hydroxyls in its molecular configuration in admixture with lithium bromide wherein the lithium bromide is present at about 0.05 to about 0.5 percent by weight based on the total weight of the curable composition.

2. The composition of claim 1 wherein the oligomeric polyacrylate is a polyacrylic acid ester of a diglycidyl ether of a dihydric phenol, a polyglycidyl ether of an aliphatic polyol or a diglycidyl ester of a dicarboxylic acid.

3. The composition of claim 2 wherein the oligomeric polyacrylate is a diacrylic acid ester of a diglycidyl ether of a dihydric phenol.

4. The composition of claim 3 wherein the oligomeric polyacrylate is a diacrylic acid ester of the diglycidyl ether of Bisphenol A.

5. The composition of claim 1 wherein the lithium bromide is added as a solution comprising about 90 to about 92.5 percent by weight polar solvent and about 10 to about 7.5 percent by weight lithium bromide.

6. The composition of claim 5 wherein the solvent is water, methanol, ethanol, isopropanol, acrylic acid or methacrylic acid.

7. The composition of claim 6 wherein the solvent is water which is present in the amount of about 1.5 to about 1.95 percent by weight based on the total weight of the composition.

8. The composition of claim 6 wherein the solvent is methanol which is present in the amount of about 1.5 to about 1.95 percent by weight based on the total weight of the composition.

9. A radiation curable composition which comprises the diacrylic acid ester of the diglycidyl ether of Bisphenol A in admixture with a solution of lithium bromide in water wherein the lithium bromide is present in the amount of about 0.05 to about 0.5 percent by weight and water is present in the amount of about 1.5 to about 1.95 percent by weight, said percents being based on the total weight of the curable composition.

10. The composition of claim 9 wherein the lithium bromide is present in the amount of about 0.1 to about 0.2 percent by weight and the water is present in the amount of about 1.8 to about 1.9 weight percent, said percents being based on the total weight of the curable composition.

11. A radiation curable composition which comprises the diacrylic acid ester of the diglycidyl ether of Bisphenol A in admixture with a solution of lithium bromide in methanol wherein the lithium bromide is present in the amount of about 0.05 to about 0.5 percent by weight and the methanol is present in the amount of about 1.5 to about 1.95 percent by weight, said percents being based on the total weight of the curable composition.

12. The composition of claim 11 wherein the lithium bromide is present in the amount of about 0.1 to about 0.2 percent by weight and the methanol is present in the amount of about 1.8 to about 1.9 percent by weight, said percents being based on the total weight of the curable composition.

13. A process for preparing a low viscosity radiation curable composition which comprises blending lithium bromide with an oligomeric polyacrylate having secondary hydroxyls in its molecular configuration and heating the blend at a temperature of about 40° C. to about 115° C. to dissolve the lithium bromide in the polyacrylate wherein the lithium bromide is present in the amount of about 0.5 to about 5 percent by weight based on the total weight of the curable composition.

14. The process of claim 13 wherein the lithium bromide is added as a polar solvent solution.

15. The process of claim 14 wherein the lithium bromide solution is blended with the oligomeric polyacrylate at a temperature of about 40° C. to about 115° C.

16. The process of claim 13 wherein the oligomeric polyacrylate is a polyacrylic acid ester of a diglycidyl ether of a dihydric phenol, a polyglycidyl ether of an aliphatic polyol or a diglycidyl ester of a dicarboxylic acid.

17. The process of claim 16 wherein the oligomeric polyacrylate is a diacrylic acid ester of a diglycidyl ether of a dihydric phenol.

18. The process of claim 17 wherein the oligomeric polyacrylate is the diacrylic acid ester of the diglycidyl ether of Bisphenol A.

19. The process of claim 14 wherein the polar solvent is water, methanol, ethanol, isopropanol, acrylic acid or methacrylic acid.

20. The process of claim 19 wherein the polar solvent is water or methanol.

21. The process of claim 14 wherein the polar solvent is present in the amount of about 1.5 to about 1.95 percent by weight based on the total weight of the curable composition.

22. A process for preparing a low viscosity, radiation curable composition which comprises blending with a diacrylic acid ester of the diglycidyl ether of Bisphenol A a solution of lithium bromide and water or methanol at a temperature of about 40° C. to about 105° C. wherein the lithium bromide is present in the amount of about 0.1 to about 0.2 percent by weight and the water or methanol is present in the amount of about 1.8 to about 1.9 percent by weight, said percents being based on the total weight of the curable composition.

23. The process of claim 22 wherein the temperature is about 93° to 105° C.

* * * * *